(12) United States Patent
Levy

(10) Patent No.: US 7,894,811 B2
(45) Date of Patent: Feb. 22, 2011

(54) SYSTEM, APPARATUS AND METHOD OF ALLOCATING MEDIUM ACCESS BLOCKS

(75) Inventor: Sharon Levy, Hadera (IL)

(73) Assignee: Intel Corporation, Santa Clara, CA (US)

( * ) Notice: Subject to any disclaimer, the term of this patent is extended or adjusted under 35 U.S.C. 154(b) by 1137 days.

(21) Appl. No.: 11/313,853

(22) Filed: Dec. 22, 2005

(65) Prior Publication Data

US 2007/0149187 A1  Jun. 28, 2007

(51) Int. Cl.
*H04Q 7/20* (2006.01)
(52) U.S. Cl. .................................. 455/425; 455/450
(58) Field of Classification Search ............... None
See application file for complete search history.

(56) References Cited

U.S. PATENT DOCUMENTS

| 2005/0099975 A1* | 5/2005 | Catreux et al. ............ 370/329 |
| 2006/0068777 A1* | 3/2006 | Sadowsky et al. .......... 455/427 |
| 2006/0140172 A1* | 6/2006 | Trainin ...................... 370/352 |

\* cited by examiner

*Primary Examiner*—Phuoc Doan
(74) *Attorney, Agent, or Firm*—Trop, Pruner & Hu, P.C.

(57) ABSTRACT

Briefly, a wireless system and a method of dynamically allocating one or more medium access blocks of a first communication network within one or more medium access blocks of a second wireless communication network, wherein the first wireless communication network operates according to a first wireless medium access scheme and the second wireless communication network operates according to a second wireless medium access scheme.

14 Claims, 3 Drawing Sheets

SYSTEM, APPARATUS AND METHOD OF ALLOCATING MEDIUM ACCESS BLOCKS

BACKGROUND OF THE INVENTION

Some hybrid wireless communication systems may include two or more wireless communication networks, for example, a cellular communication network and a broadband wireless network. In this exemplary wireless communication system, the cellular communication network may include a Global System for Mobile Communications (GSM) and the wireless broadband system may include a network based on to IEEE 802.16e also know in the art as WiMAX.

In order to provide the hybrid wireless communication system to both cellular communication network and the broadband wireless networks, operators of the hybrid wireless communication system may allocate the hybrid wireless communication system resources (e.g. spectrum) to legacy user equipment (UE)'s of the cellular network to enhanced UEs of the broadband wireless network in parallel. The deployments for several standards, for example GSM and IEEE 802.16e, in parallel may be based on segregating the operator frequency band to non overlapping sub-bands. The non overlapping sub-band may be used exclusively by a single standard (e.g., GSM or IEEE 802.16e). The bandwidth allocated to be used by the cellular communication network and/or the wireless broadband network may be set according to the usage and the limitations of the cellular communication network and/or the wireless broadband network.

The basic time units of the different standards (e.g. IEEE 802.16e and GSM) are in many cases uncorrelated. This means that the cellular communication network and/or the wireless broadband network may have different procedures and control channels (e.g. synchronization) to access the network. The duplication of procedures and control channels may increase the complexity of the UE and networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
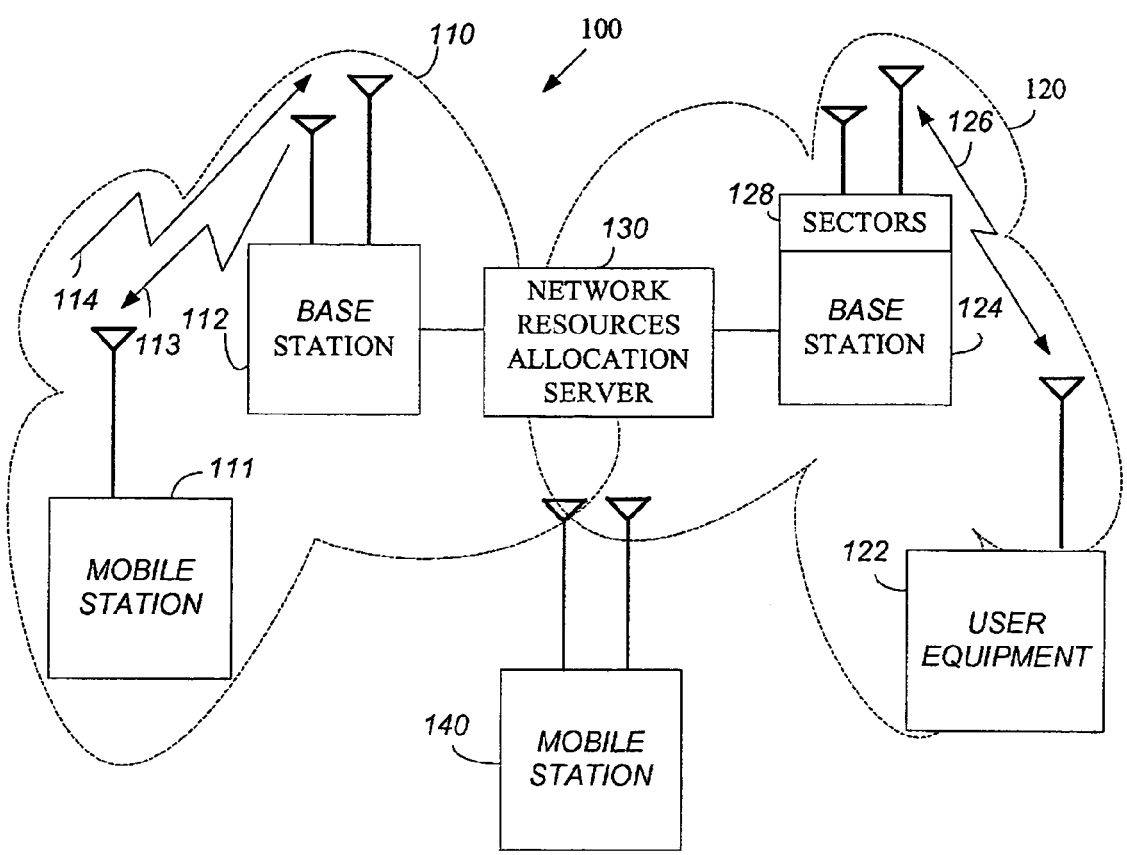
FIG. 1 is a schematic block diagram of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, wireless metropolitan area network (WPAN) stations or the like. Portable communication devices intended to be included within the scope of the present invention may include, by a way of example only, cellular radiotelephone portable communication devices, digital communication system portable devices, and the like.

Types of cellular radiotelephone systems intended to be within the scope of the present invention include, although are not limited to, Global System for Mobile communication (GSM) cellular radiotelephone, General Packet Radio Service (GPRS), Extended GPRS (EGPRS), and the like.

For simplicity, although the scope of the invention is in no way limited in this respect, embodiments of the present that will be described below may be related to a GSM family of cellular radiotelephone The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cell-phone, a cellular device, personal computer, Personal Digital Assistant (PDA), user equipment and the like.

Some embodiments of the invention may be implemented, for example, using a machine-readable medium or article which may store an instruction or a set of instructions that, if executed by a machine (for example, by a wireless station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Referring firstly to FIG. 1, a block diagram of a wireless communication system 100 according to some embodiments of the present invention is shown. Wireless communication system 100 may include a first wireless communication network 110, a second wireless communication network 120 and a network resources allocation server 130.

According to this exemplary embodiment, communication network 110 may include at least one mobile station 111 and at least one base station 112. Base station 112 may transmit over a downlink channel 113 modulated radio frequency (RF) signals, if desired. Mobile station 111 may transmit over an uplink channel 114 modulated RF signals to base station 112. In addition, in some embodiments of the invention, wireless communication network 110 may include a cellular communication network which may operate according to a desired wireless access scheme such as for example, GSM, WCDMA or the like.

According to this exemplary embodiment, wireless communication network 120 may include a user equipment (UE) 122, for example a lap top computer having a wireless network interface card (NIC) and a base station 124 for example, an access point (AP) and/or a public access point of a broadband communication network (e.g., WiMAX), if desired. Base station 124 may include one or more serving sectors 128 for example, three serving sectors, and may use one or more of serving sectors 128 to transmit and/or receive modulated RF signals through a channel 126, if desired. It should be understood that a serving sector may be an antenna beam sector which the base station may use to transmit modulated RF signals to UEs within different geographical and/or physical locations. Furthermore, wireless communication network 120 may include a wireless network communication system operating according to a desired wireless access scheme such as, for example, IEEE 802.16e 2005 Standard, or the like.

According to some exemplary embodiments of the invention, downlink 113, uplink 114, cannel 126, frequencies, sub-channels, frequency bands, wireless network access schemes, signal modulation schemes, and the like, may be referred to as "network resources". The network resources may be defined and assigned by medium access blocks. The medium access blocks may include frequencies, sub-channels, frequency bands or the like. Furthermore, in some exemplary embodiments of the invention, a medium access block may includes a continuous frequency band over a time interval, if desired.

Although the scope of the present invention is not limited in this respect, network rescores allocation server 130 may be operably coupled to base station 112. Network resources allocation server 130 may be capable of dynamically allocating one or more medium access blocks (e.g. frequency band or the like) of a wireless communication network 110 within one or more medium access blocks of wireless communication network 120. It should be understood that in some embodiments of the invention, network resources allocation server 130 and base stations 112 may be implemented as a single station capable of operating simultaneously with both wireless communication networks 110 and 120.

In some embodiments of the invention, wireless communication system may include a dual mode mobile station 140. According to an exemplary embodiment of the invention, dual mode mobile station 140 may include one or more antennas 142 and 146. Antennas 142 and 146 may be able to transmit and/or receive modulated RF signals according to wireless network access schemes of both wireless communications networks 110 and 120. Antennas 142 and 146 may include for example, a dipole antenna, an internal antenna, a monopole antenna or the like. In some embodiments, the receiver and the transmitter may use different antennas. Furthermore, one antenna may be used to transmit according to one wireless network access scheme while the other antenna may receive signals according to the second wireless network access scheme and vice versa, although it should be understood that the scope of the present invention is in no way limited in this respect.

Figure 2:
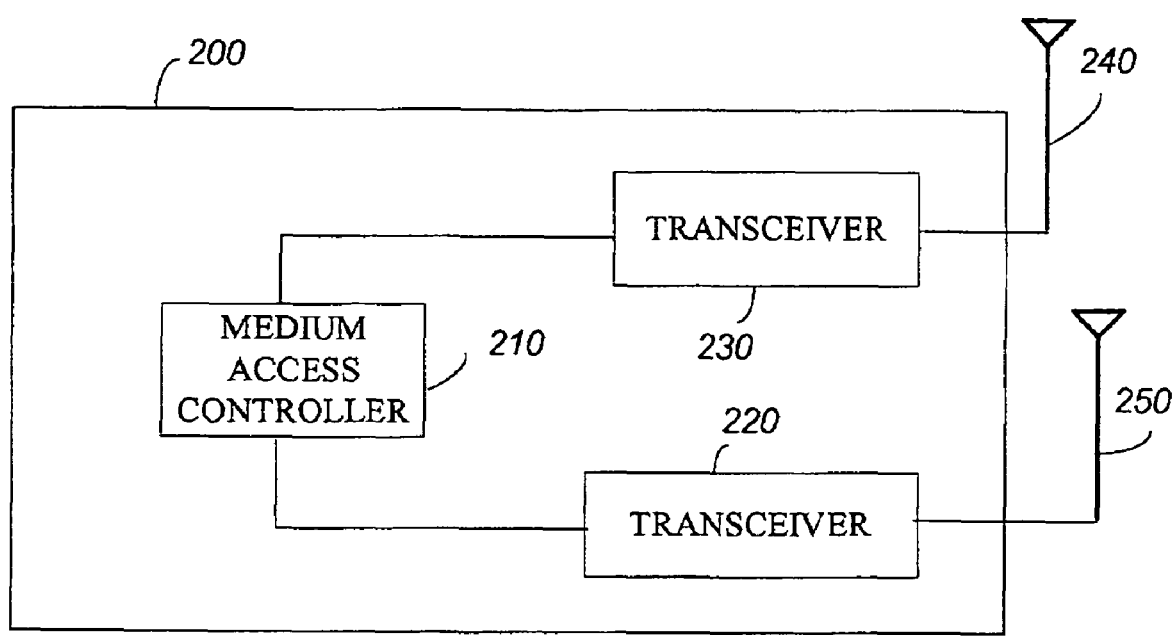
FIG. 2 is a block diagram of a wireless communication device according to an exemplary embodiment of the present invention.

Turning to FIG. 2, an illustration of a block diagram of an apparatus 200 according to exemplary embodiments of the invention is shown. Apparatus 200 may be or may include a network resources allocation server and/or a base station and or a dual mode mobile station (e.g., mobile station 140).

According to this exemplary embodiment of the invention, apparatus 200 may include a medium access controller 210 operably coupled to a transceiver 230 and to a transceiver 220, which may use antennas 240, 250, respectively. Antennas 240 and 250 may be able to transmit and/or receive RF signals according to an allocation scheme defined and/or controlled by medium access controller 210. Although it should be understood that in other embodiments of the present invention a single antenna may be used to transmit and/or receive RF signals according to an allocation scheme of medium access controller 210.

According to embodiments of the present invention, apparatus 200 may be able to operate on two or more wireless communication networks simultaneously. In this example, apparatus 200 may able to operate simultaneously on two different types of wireless communication networks having different wireless medium access schemes, for example, Orthogonal Frequency Division Multiplexing (OFDM), Time Division Multiple Access (TDMA) and the like.

Although the scope of the present invention is not limited in this respect, it should be understood that transceivers 230 and 220 may include transmitters and receivers. According to embodiments of the invention, transceiver 220 may be able to transmit and/or receive RF signals according to one medium access scheme for example, GSM; and transceiver 230 may be able to transmit and/or receive RF signals according to another medium access scheme, for example, WiMAX. Medium access controller 210 may be capable of dynamically allocating one or more medium access blocks of a first communication network (e.g., wireless communication network 110) within one or more medium access blocks of a second wireless communication network (e.g., wireless communication network 110). According to some embodiments of the present invention, the medium access block may include a continuous frequency band over a time interval.

According to embodiments of the invention, medium access controller 210 may allocate one or more access blocks of the first communication network (e.g., GSM) to the second communication system (e.g., WiMAX) when not transmitting a signal of the first communication network. For example, the transmitter of transceiver 220 may transmit the allocated signal.

In some exemplary embodiments of the invention, medium access controller 210 may provide to transceivers 220, 230 a control signal which is common to the first and second wireless medium access schemes, for example, a TDMA control signal, if desired. Furthermore, medium access controller 210 may allocate medium access blocks of cellular communication network for a voice signal and medium access blocks of wireless broadband communication network for data signals.

In some other embodiments of the invention, medium access controller 210 may allocate one wireless medium access scheme to an uplink channel (e.g., uplink 114) and another wireless medium access scheme for a downlink channel (e.g., downlink 113), if desired.

According to some embodiments of the invention, medium access controller 210 may allocate the one or more medium access blocks of one wireless communication network (e.g., a cellular network) within one or more medium access blocks of another wireless communication network (e.g., a broadband wireless communication network) according to a statistical multiplexing scheme that takes into account both time and frequency multiplexing.

Figure 3:
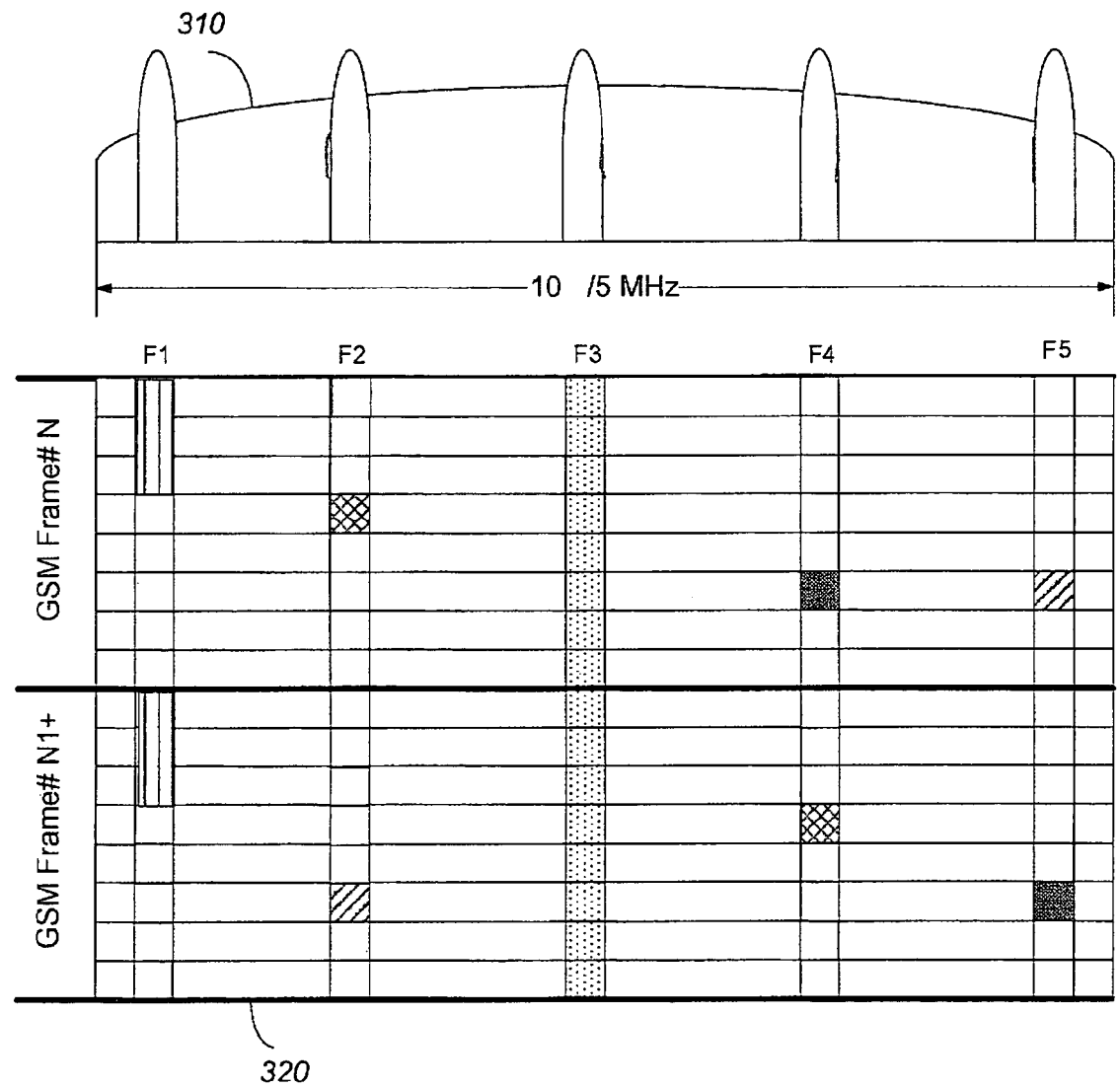
FIG. 3 is an illustration of a frequency allocation scheme helpful for describing a method of frequency allocation of medium access blocks of two or more wireless communication networks according to exemplary embodiments of the invention.

Turning to FIG. 3 an illustration of a frequency allocation scheme helpful for describing a method of frequency allocation of medium access block of two or more wireless communication networks according to exemplary embodiments of the invention is shown. Although the scope of the present invention is not limited in this respect, the method may allocate medium access blocks (e.g., GSM channels) of one wireless communication network inside a medium access channel block of another wireless communication network, e.g., an OFDM band. According to this example, when the GSM communication network does not use one or more channel resources such as, for example, a frequency (e.g. empty slot), the OFDM communication network may use the free channel resource to transmit OFDM bins, if desired.

According to other embodiments of the invention, for example, when a surge of GSM usage is detected, more GSM channel resources may be allocated by utilizing unused OFDM channel resources, if desired.

According to the above described method, an exemplary frequency allocation scheme of GSM frequency carriers inside an OFDM band of 10 to 5 MHz may be represented by a spectrum of frequency bands as depicted by diagram 310 in FIG. 3. In some embodiments, the GSM carriers may spread over the entire OFDM band, e.g., to achieve maximum frequency diversity. The lower part of FIG. 3 depicts the actual frequency usage over time and frequency. The Y axis is the time in GSM slot units; the X axis is the frequency band. It will be appreciated that the GSM system represented in FIG. 3 is not fully loaded and its frequencies could be used to transmit OFDM bins. This approach provides the operator the flexibility to have a gradual integration of the new OFDM based RAN, without harming its current GSM deployment. Over time, the GSM deployment would be minimized.

According to some exemplary embodiments of the invention, transmission multiplexing may be preformed according to a frequency allocation scheme as depicted by diagram 320 in FIG. 3. According to this example, the GSM system may include a beacon channel (shown as F3), also known in the art as BCCH, which may be transmitted with a constant transmission power. The basic frame structure of GSM may include a plurality of frames of 8 time slots. The 8-time-slot frames may be used as a basic transmission unit of the GSM system. In some embodiments of the invention, the GSM system may not be fully loaded and, thus, some slots may be used by the second system (e.g. WiMAX) according to some embodiments of the invention.

According to this exemplary embodiment, frequencies F1 to F8 may represent frequencies of a sector of the GSM system. At frequency F1, a first user of the GSM system may use three consecutive slots (shown with a vertical lines pattern) to transmit data, for example, on GPRS and EGPRS channels; a second user (shown with a diamonds pattern) may use one slot to transmit voice; and a third user (shown with a diagonal lines pattern) may use one slot to transmit voice. The other free slots may be used by another wireless communication system to transmit signals, if desired.

according to some embodiments of the invention, the first user may retransmit data at frequency F2, the second user may retransmit the voice slot at frequency F4, and the third user may transmit the voice slot at frequency F5, although the scope of the present invention is in no way limited in this respect.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising: a medium access controller to dynamically allocate one or more medium access blocks of a first communication network within one or more medium access blocks of a second wireless communication network according to a statistical multiplexing scheme that takes into account both time and frequency multiplexing, wherein the first wireless communication network operates according to a first wireless medium access scheme and the second wireless communication network operates according to a second wireless medium access scheme, wherein the medium access blocks comprise a continuous frequency band over a time interval; and wherein the medium access controller to provide a control signal which is common to the first and second wireless medium access schemes; and allocate the medium access blocks of the first communication network for a voice signal and the medium access block of the second communication network for data signals.

2. The apparatus of claim 1, wherein the first wireless medium access scheme comprises an Orthogonal Frequency Division Multiplexing access scheme.

3. The apparatus of claim 1, wherein the wireless medium access scheme comprises a Time Division Multiple Access scheme.

4. The apparatus of claim 1 comprising:
a transmitter to transmit a signal of the second communication network over the allocated one or more access blocks of the first communication network when not transmitting a signal of the first communication network.

5. The apparatus of claim 1, wherein the medium access controller to allocate the first wireless medium access scheme to an uplink channel and the second wireless medium access scheme for a downlink channel.

6. The apparatus of claim 1, wherein the first wireless communication network comprises a cellular communication network and the second wireless communication network comprises a wireless broadband communication network.

7. A method comprising: dynamically allocating one or more medium access blocks of a first communication network within one or more medium access blocks of a second wireless communication network according to a statistical multiplexing scheme of both time interval and frequency band, wherein the first wireless communication network operates according to a first wireless medium access scheme and the second wireless communication network operates according to a second wireless medium access scheme, and wherein the medium access block includes a continuous frequency band over a time interval; and wherein the medium access controller to provide a control signal which is common to the first and second wireless medium access schemes; and allocate the medium access blocks of the first communication network for a voice signal and the medium access block of the second communication network for data signals.

8. The method of claim 7, comprising:

transmitting a signal of the second communication network over the allocated one or more access blocks of the first communication network when not transmitting a signal of the first communication network.

9. The method of claim 7, wherein allocating comprises:

allocating the first wireless medium access scheme to an uplink channel and the second wireless medium access scheme for a downlink channel.

10. A wireless communication system having first and second wireless communication networks, the system comprising:

a network rescores allocation server capable of dynamically allocating one or more medium access blocks of the first communication network within one or more medium access blocks of the second wireless communication network according to a statistical multiplexing scheme that takes into account both time and frequency, wherein the first wireless communication network operates according to a first wireless medium access scheme and the second wireless communication network operates according to a second wireless medium access scheme, wherein the medium access block comprises a continuous frequency band over a time interval; and wherein the network resource allocation server is providing a control signal which is common to the first and second wireless medium access schemes; and allocate the medium access blocks of the first communication network for a voice signal and the medium access block of the second communication network for data signals.

11. The wireless communication system of claim 10, wherein the first wireless medium access scheme comprises an Orthogonal Frequency Division Multiplexing access scheme.

12. The wireless communication system of claim 10, wherein the wireless medium access scheme comprises a Time Division Multiple Access scheme.

13. The wireless communication system of claim 10, wherein the network rescores allocation server is capable of allocating the first wireless medium access scheme to an uplink channel and the second wireless medium access scheme for a downlink channel.

14. The wireless communication system of claim 10, wherein the first wireless communication network comprises a cellular communication network and the second wireless communication network comprises a wireless broadband communication network.

* * * * *